United States Patent [19]

Beyn

[11] Patent Number: 4,687,983
[45] Date of Patent: Aug. 18, 1987

[54] ALTERNATION CONTROL SYSTEM HAVING MANUAL CURRENT SELECTION CAPABILITY AND VOLTAGE DEPENDENT CUTOFF CIRCUIT

[76] Inventor: Edgar J. Beyn, 8 Revell St., Annapolis, Md. 21401

[21] Appl. No.: 692,232

[22] Filed: Jan. 17, 1985

[51] Int. Cl.[4] .................................................. H02J 7/14
[52] U.S. Cl. ........................................ 322/28; 320/64; 322/25; 322/73
[58] Field of Search ....................... 322/28, 25, 64, 68, 322/59, 60, 87, 88, 72, 73; 320/37, 38, 15; 307/10 R, 16

[56] References Cited

U.S. PATENT DOCUMENTS

| | | | |
|---|---|---|---|
| 3,456,119 | 7/1969 | Schneider | 307/10 R |
| 3,471,706 | 10/1969 | Schneider | 307/10 R |
| 3,614,459 | 10/1971 | Watson | 307/10 R |
| 4,041,363 | 8/1977 | Scheidler | 320/15 |
| 4,090,122 | 5/1978 | Hoinski | 320/15 X |
| 4,136,311 | 1/1979 | Schneidler | 322/28 |
| 4,286,205 | 8/1981 | Watrous | 322/28 X |

Primary Examiner—R. J. Hickey
Attorney, Agent, or Firm—Kenneth E. Darnell

[57] ABSTRACT

An alternator control system for controlled charging of a secondary battery such as a lead-acid battery, the invention allows manual selection of alternator output current. The control system of the invention is connected to the alternator field terminal in parallel to the voltage regulator. The selected alternator output current is essentially constant to allow estimation of the time necessary to charge a given number of ampere hours. The present control system also incorporates a voltage sensing cutoff circuit which disconnects the control system from the alternator when the battery has reached full charge, when the selected charging current becomes excessive as the battery approaches full charge, or when a charging current is selected which is excessive for the capacity of a given battery.

13 Claims, 2 Drawing Figures

ALTERNATION CONTROL SYSTEM HAVING MANUAL CURRENT SELECTION CAPABILITY AND VOLTAGE DEPENDENT CUTOFF CIRCUIT

BACKGROUND OF THE INVENTION

1. Field of the Invention

The invention relates generally to alternator systems for charging secondary batteries and particularly to an alternator system allowing manual selection of charging current and having the capability of discontinuing charging current on attainment of full charge or in the event of conditions capable of damaging a battery.

2. Description of the Prior Art

Secondary batteries are commonly used in situations where electricity is drawn from the battery during a period of time when recharging power is not available, electricity thus being drawn into the battery during one time interval with recharging occurring during another time interval. Particular situations where these conditions exist occur on boats, recreational vehicles and other situations wherein electricity is needed for function such as lighting, refrigeration, etc. during periods when the battery is not being recharged through operation of an engine. In such situations, a battery must be recharged during subsequent engine operation and at a charging rate which is commensurate with a reasonable period of engine operation. In practice, recharging of such batteries with high currents during a relatively short recharging time is not possible due to deleterious effects within the battery of heat generation and chemical reactions occurring at battery plates which would be caused by recharging at too high a current rate and within a period of time which is too short for a given battery. In the prior art, the risk of overheating a battery by a high charging current exists where relatively small batteries are connected to sources of charging current with potentially high output capacity. In such situations, alternator systems must be operated in concert with a regulator which automatically limits battery charging current. Prior regulators used for limiting the battery charging current typically limit the applied voltage although other variables can be employed. The recharging of lead-acid batteries, the most common battery used on boats, recreational vehicles and in other similar situations, is usually made automatic by the maintenance of a preselected voltage which is applied to the battery. Battery charging by regulation of voltage invariably relies on the gradual increase of battery voltage to cause charging current to diminish or stop when the battery reaches full charge. A primary disadvantage of these prior systems in the length of time needed to recharge the last third to one-half of a battery's capacity. Even though recharging to approximately half of the battery's capacity occurs relatively quickly, complete recharging requires a much greater period of time due to the fact that recharging becomes increasingly ineffective.

Prior systems employed to charge secondary batteries are exemplified by U.S. Pat. No. 4,136,311 to Scheidler who describes the use of a high battery charging current during initial charging followed by voltage switching to a lower rate for completion of charge. Watrous, in U.S. Pat. No. 4,286,205, provides an "add-on" circuit which is additional to an alternator and voltage regulator, the additional circuit supplying an added field current so that the alternator can be used to supply higher than normal power output. Chait, in U.S. Pat. No. 3,193,750, uses battery voltage to control an SCR and uses a zener diode to facilitate use of a high battery charging current until battery voltage reaches a predetermined point, whereupon charge rate is reduced to a "trickle" condition. In U.S. Pat. No. 4,315,205, Mori describes apparatus capable of switching from a normal voltage regulation for battery charging to a lower voltage regulation in case of failure in portions of the charging system. Burkett, in U.S. Pat. No. 3,436,639 avoids battery overcharging by providing a voltage sensitive trigger circuit having at least one zener diode and voltage divider resistance for triggering an SCR, the circuit shorting a generator or alternator and parallel to an alternator and battery, the circuit bypassing excess charging current to ground.

The prior art, including those systems exemplified by the patents referred to above, typically function by sensing the existence of high voltage conditions, acting to reduce the potential for damage occasioned by the high voltage condition, and then returning to a first set of conditions wherein the apparatus continues to function. In order to provide desirably safe operating conditions, there is a need in the art for an alternator system having a high recharging rate wherein charging current can be manually set according to a set of factors including estimated engine operating time and whereby operation of the alternator can be discontinued in the event of conditions potentially damaging to the battery.

SUMMARY OF THE INVENTION

The present invention provides an alternator system which is particularly useful on vehicles such as boats, recreational vehicles and the like wherein batteries are recharged by means of an alternator and wherein electricity is drawn from a battery during periods of time when an alternator is not in operation. The charging current employed to recharge batteries in such situations can be manually selected by estimation of the ampere hours which have been drained from a battery prior to the start of an engine and alternator. An alternator control is then used to select a charging current which allows recovery to the same state of charge which existed prior to electricity usage and within the intended length of engine running time.

As an example, the electrical equipment on a boat at anchor without engine operation uses an average of five amps or about 60 ampere hours in a 24 hour period, that electricity being supplied by secondary batteries which must then be recharged. On starting of the engine for usual operation of the boat, an alternator having manual selection of charging current can be selectively adjusted to a value of approximately 30 amperes such that operation of the engine for approximately two hours will charge the batteries to approximately the same state of charge which existed at the beginning of the 24 hour period. Since the size or capacity of secondary batteries and the state of charge of the battery place limitations on the charging current which can be utilized, the use of a protective circuit is necessary in order to prevent battery damage due to heat or electrolyte loss. The present alternator system provides a voltage dependent cutoff circuit capable of being adapted to all common alternator systems used with engines in automotive, marine, aviation, agricultural and industrial applications whether of the positive or negative type. The present system is connected in parallel with the voltage regulator of existing systems and can be connected and operated in these situations without internal modifications.

The present alternator system limits accessory battery charging and permanently switches the control portion of the system to an off position rather than maintaining limited charging conditions or automatically resetting or readjusting the system itself. The present alternator control system can be connected to an alternator and/or voltage regulator remaining in tact. The control system overrides the on-off switch and permanently switches the control off when unsafe charging conditions have been detected. The present control system can reset itself and resume the hand-selected charging current only after the engine itself has been shut down, the control being activated only after a period of electricity consumption without alternator operation has passed and the next recharging cycle has been started. The cutoff capability of the present system can be reset manually by the operator while the engine and alternator are operating. However, the control will again discontinue operation if unsafe conditions prevail so that operator error in selection of charging current is avoided.

Reliability and simplicity is imparted to the present control system by depending the safety cutoff circuit of the system on a variable which is easily measured and which is particularly indicative of the need for system shutdown. Battery voltage is selected as this variable due in part to the increase of battery voltage with the increasing state of charge of a battery and due to battery voltage increase with increasing charging current or to the ratio of charging current to battery capacity regardless of the state of charge of the battery. Battery voltage is also easily monitored at the battery terminals or the connection of the terminals to an alternator, voltage regulator, and/or alternator control without the requirement for additional wires or sensors. The present alternator control system responds to the combined voltage changes taken from the state of charge of the battery and the relative charging current or ratio of amperes per ampere hour of battery capacity.

The present alternator control system is capable of regulation by hand knob currents between about 3 amperes and less than about 100 milliamperes from an input supply of 8 to about 16 volts in applications where 12 volts is typically nominal. The present system also switches current off when the system voltage, which may be the supply voltage, rises to a cutoff set point which is typically in the range between 13.5 volts and about 15.5 volts. In order to control cost and impart reliability to the system, solid state components are utilized in place of rheostats, relays and the like.

Accordingly, it is a primary object of the present invention to provide an alternator control system which can be utilized in the recharging of secondary batteries with alternator systems and voltage regulators, the invention allowing temporary override of a voltage regulator to produce greater alternator output current under conditions where alternator output voltage is greater than that allowed by the voltage regulator but lower than voltages which are unsafe or inefficient for battery charging, the charging current being manually selected in order to reduce charging time in situations wherein electrical power is drained from batteries without the benefit of alternator operations and wherein only limited periods of time are available for recharging of batteries.

It is another object of the present invention to provide an alternator control system having a voltage sensing circuit which switches off and disables an alternator apparatus when a predetermined voltage has been reached, a cutoff voltage being selected to match a wide range of ratios of alternator sizes to battery capacities.

It is a further object of the present invention to provide an alternator control system useful for recharging of secondary batteries wherein the charging current is selected by an operator as required according to particular circumstances, the selection of a higher charging current than a particular battery can tolerate, such as due to operator error, causing the tripping of a voltage sensing cutoff circuit regardless of battery charge level or condition and wherein full battery charging produces a voltage sensing cutoff which terminates a voltage regulator override, irreversibly, to return an alternator to voltage regulator operation.

BREIF DESCRIPTION OF THE DRAWINGS

FIG. 1 is a circuit diagram of an alternator control system according to the invention wherein a voltage regulator of a battery charging system is connected between a negative field coil terminal and ground; and FIG. 2 is a circuit diagram of an alternator control system according to the invention connected to an alternator wherein a voltage regulator is connected between the positive terminal of the system and the positive field coil terminal.

DESCRIPTION OF THE PREFERRED EMBODIMENTS

Figure 1:
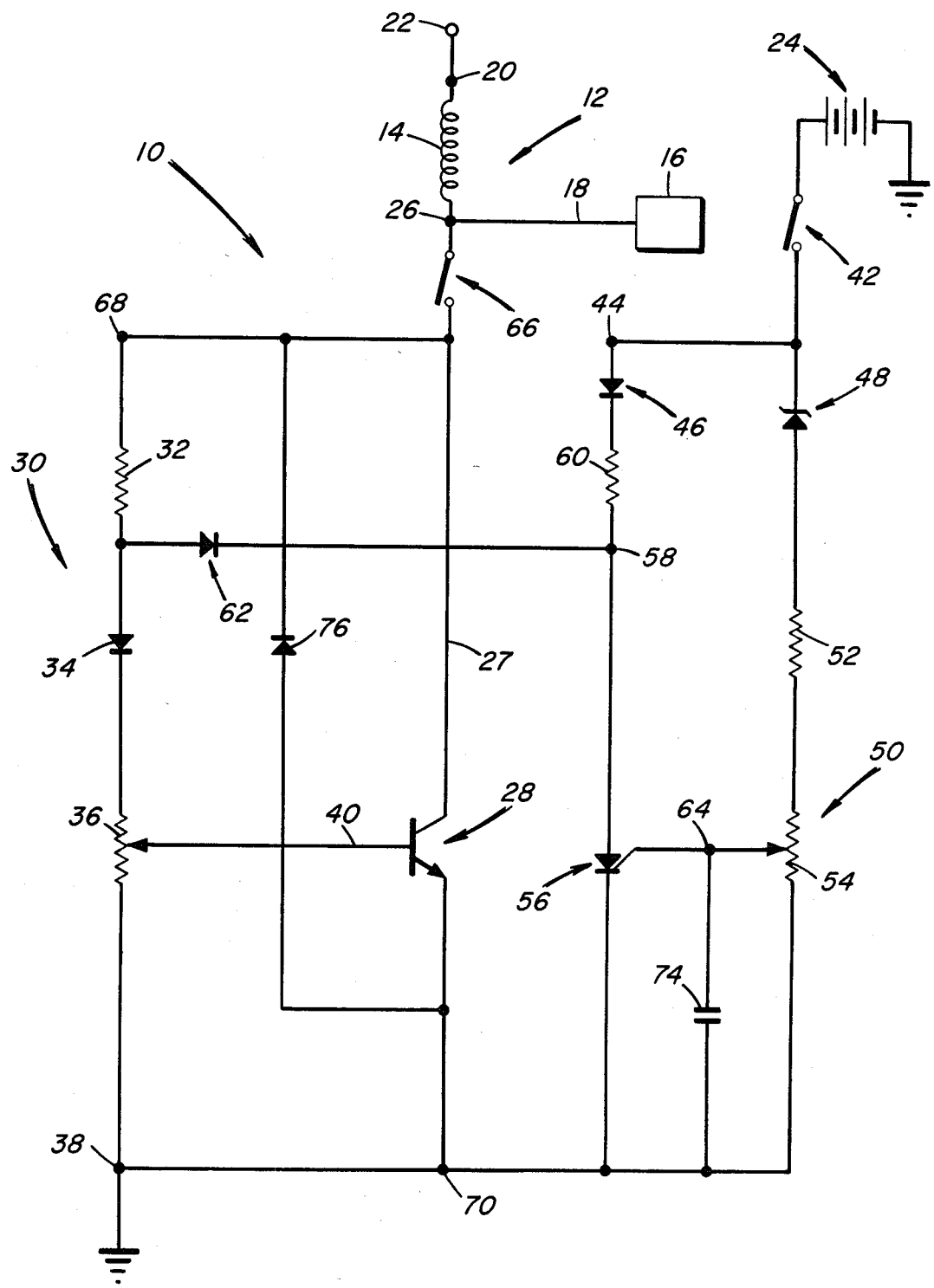

Referring now to the drawings and particularly to FIG. 1, an alternator control system 10 configured according to a first embodiment of the invention comprises an alternator 12 having a field coil 14 connected to a voltage regulator 16 by a conductor or field wire 18. Positive field coil terminal 20 of the field coil 14 is connected to terminal 22 of a source of positive voltage which comprises battery 24. In alternate systems, the source of positive voltage can be derived from auxiliary rectifying diodes (not shown) within the alternator 12. In normal operation, field current flows from the terminals 20 and 22 through the field coil 14 to negative field coil terminal 26 and then through the conductor 18 and the voltage regulator 16 to ground or to minus. The alternator 12 is thereby seen to be the type in which the voltage regulator 16 is connected between the negative field coil terminal 26 and ground, the excitation field current in the alternator 12 being controlled by the voltage regulator 16 which is electrically connected in series with the field coil 14.

The negative field coil terminal 26 is connected to collector 27 of NPN transistor 28 and to a circuit shown generally at 30 to comprise resistor 32, diode 34 and potentiometer 36. The wiper (not shown) of the potentiometer 36 can be moved from a position nearmost terminal 38 or minus or ground to a position nearmost the diode 34 and, in so doing, will supply base current through conductor 40 to the transistor 28 in a range which has said transistor in a non-conducting state at one end to near saturation or full conduction at the other end of the range. The resistor 32 is chosen so that the transistor base current renders the transistor 28 fully conductive when the wiper of the potentiometer 36 is nearest its positive end which is nearest the diode 34 and the resistor 32.

With a given alternator speed, output voltage of the alternator 12 proportionally increases with increasing current through the field coil 14 which increases with increasing conductivity of the transistor 28 which, in turn, increases with increasing base current chosen with the wiper of the potentiometer 36. The increase in alternator output voltage affects the voltage regulator 16 which proportionally decreases its field current from the negative field coil terminal 26 through the conductor 18 and the voltage regulator circuit to minus or ground. The effect of field current flow through the transistor 28 on the voltage regulator 16 is that field current by the voltage regulator 16 ends.

The rate of alternator field current chosen with the potentiometer 36 results in alternator output voltages which causes battery charging currents normally monitored with an ampere meter (not shown). The alternator generating coils, rectifying diodes, ouput terminals and connections to batteries are not shown for simplicity but follow standard practice in the field. From the positive terminal of the battery 24 which is being charged by the alternator 12, a conductor leads through switch 42 to terminal 44, light emitting diode 46 and zener diode 48. The zener diode 48 is selected to become conductive at a voltage approximately one volt below the nominal voltage of the battery 24. For a 12 volt battery, the zener diode 48 is rated 11 volt. A voltage divider shown generally at 50 consists of a resistor 52 and trim potentiometer 54, the voltage divider being connected between the zener diode 48 and ground. The wiper (not shown) of the trim potentiometer 54 is connected to gate terminal 64 of a silicon controlled rectifier 56 which becomes conductive when the voltage at the terminal 44 reaches a value which has been selected to indicate either that the battery 24 which is being charged with the alternator 12 has reached a state of recharge which is the maximum safely attainable with the chosen charging current or that the charging current selected with the potentiometer 36 was excessive for the battery 24.

The potentiometer 54 is adjusted so that the silicon controlled rectifier 56 becomes conductive when the typical charging current chosen by the operator causes the battery 24 which is being charged to reach the highest practical recharge level with that rate before beginning excessive gas evolution. At that point, the silicon controlled rectifier 56 opens a conductive path between its anode 58 and the terminal 38 and ground. Current begins to flow through the light emitting diode 46 and a current limiting resistor 60 and causes the diode 46 to light up. Current also begins to flow through a blocking diode 62 and diminishes current through the diode 34 sufficiently to interrupt any base current of the transistor 28 and renders the transistor non-conducting. As the silicon controlled rectifier 56 becomes conductive, any field current chosen by the operator with the setting of the potentiometer 36 is interrupted and the operator alerted to the fact by the lighted light emitting diode 46.

The firing voltage applied to the gate terminal 64 of the silicon controlled rectifier 56 is chosen by the setting of the potentiometer 54 and is matched to the capacity of the particular alternator 12. The charging current is chosen by the operator and is dependent on the running time allowed for recharging of the battery 24 and the capacity of the battery 24 or bank of batteries which are being charged. The setting of the potentiometer 54 determines the cutoff voltage at which the extra field current is interrupted. Current through the light emitting diode 46 and the resistor 60 and current through the resistor 32 and the diode 62 is sufficiently great to hold the silicon controlled rectifier 56 in a conducting state and to prevent any overriding field current flow until the circuit is reset by the operator, or until after the electric system of the vehicle has been switched off and has been switched on again. This switching typically occurs when the engine (not shown) has been stopped and restarted, for example, on the next day. The circuit can be reset by the operator by first reducing the chosen field current setting of the potentiometer 36 and then opening the switch 42 which unlatches the silicon controlled rectifier 56. When the switch 42 which is best combined with a switch 66 in a double pole configuration is again closed, the lower alternator output voltage due to the reduced setting of the potentiometer 36 will have a lower voltage appear at the terminal 44 and the cathode of the zener diode 48 than that which appeared with the earlier higher output and charging current. Although this voltage will again gradually increase as battery charging progresses, some time will pass before the cutoff setting is again reached and the circuit again disconnected. In this time, a more complete recharge of the battery 24 can be accomplished than was possible with the higher charging rate which was selected at the onset.

Figure 2:
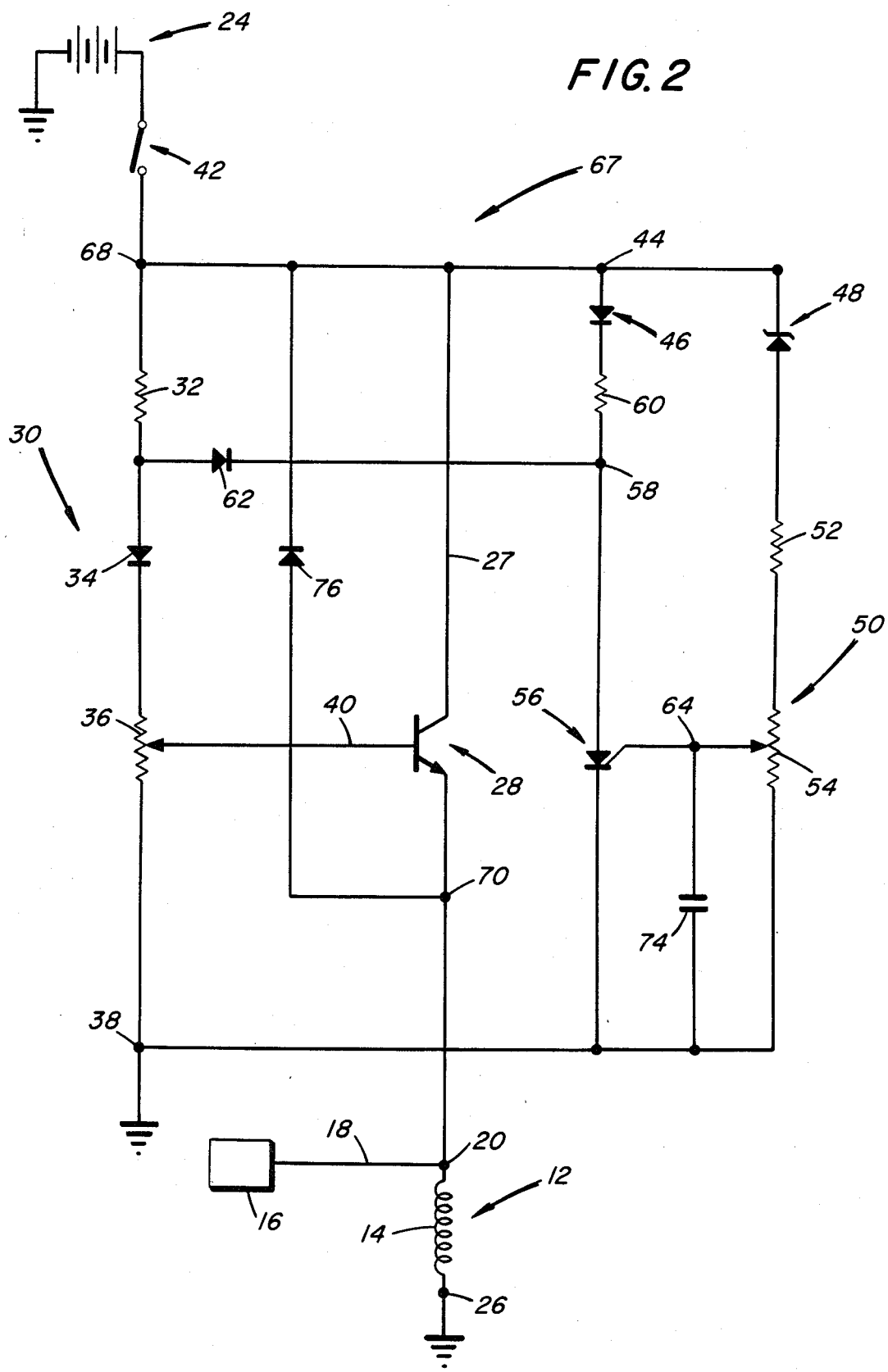

Referring now to FIG. 2, a system is seen at 67 which is similar to the system 10 shown in FIG. 1, like elements in the respective systems being referred to by the same numeral. In the system 67, the voltage regulator 16 is connected between the positive terminal of the system 67 and the positive field coil terminal 20. In essence, the field coil 14 of the alternator shown generally at 12 has the negative field coil terminal 26 connected to minus or ground, the voltage regulator 16 supplying its field current through the conductor 18 to the positive field coil terminal 20. The circuit of FIG. 2 differs primarily from the circuit of FIG. 1 by virtue of the connection of terminal 68 and the terminal 44 to the positive side of the battery system in the system of FIG. 2 and by the connection of emitter 70 of the transistor 28 directly to the positive field coil terminal 20 in the system of FIG. 2.

In normal operation of the system of FIG. 2 including the voltage regulator 16, the alternator 12 receives field current in accordance with the alternator output voltage which is measured by the voltage regulator 16 and which the voltage regulator 16 maintains at a preselected voltage level. This voltage results in a battery charging current which in some types of battery uses requires very long recharging time or results in incompletely recharged batteries. An operator may chose to increase alternator output voltage and battery charging rate by closing the switch 42 which connects the positive battery terminal of the battery 24 through the resistor 32 and the diode 34 to a potentiometer 36. The wiper of the potentiometer 36 can be moved by the operator from a position near the terminal 38 and minus or ground to a position nearer the diode 34 which causes increasing base current to flow through the conductor 40 at the transistor 28. Such base current causes the transistor 28 to become increasingly conductive and to allow current to flow between the positive battery terminal and the ground through the alternator field coil 14, emitter 70 and the collector 27 of the transistor 28. Under a given set of conditions wherein factors such as alternator speed, battery capacity and state of charge are factors, an increase in alternator field current will result in a proportional increase in alternator output voltage and battery charging current.

The alternator generating coils, rectifying diodes, output terminal and the connections to the battery or bank of batteries is not shown in FIG. 2 for ease of illustration but is consistent with standard practice in the field and typically includes an ampere meter which will indicate the alternator output current chosen by the operator with the setting of the potentiometer 36. To achieve the desired charging rates, field current is often increased enough to cause the alternator output voltage to exceed the voltage which the voltage regulator 16 is designed to maintain. The voltage regulator 16 will at that point discontinue its supply of field current until after the field current through the transistor 28 has ended. In the case of electromechanical voltage regulators, intermittent connection of the conductor 18 is made to ground and a blocking diode (not shown) is needed in the conductor 18 to prevent field current flow through the transistor 28 and between the terminal 20 and ground through the voltage regulator 16 and the conductor 18. The blocking diode referred to immediately above is not shown in FIG. 2 but would be oriented with its cathode toward the terminal 20.

In the event that the alternator output current chosen by the operator is greater than the battery 24 can efficiently accept, either because the alternator capacity and speed is high or the battery capacity low, battery voltage will increase regardless of the state of charge of the battery 24 and such voltage will cause the zener diode 48 to be conductive and will cause sufficient gate current to flow through the resistor 52 and the potentiometer 54 and through the gate terminal 64 of the silicon controlled rectifier 56 to render it conductive. At that time, current through the resistor 32 will be diverted through the diode 62 and the silicon controlled rectifier 56 to ground, instead of flowing through the diode 34 and the potentiometer 36 so that regardless of the wiper position of the potentiometer 36, base current to the transistor 28 is ended and the field current through the transistor interrupted as the transistor becomes non-conducting.

If a high but not excessive alternator output current is selected, battery charging will progress and the battery voltage will gradually increase. The zener diode 48 and the resistor 52 in series with the potentiometer 54 are chosen to supply gate current to the silicon controlled rectifier 56. The zener diode 48 has a nominal voltage rating one volt below the nominal voltage of the battery system and the resistor 52 and the range of the potentiometer 54 allow the setting of a cutoff voltage which is matched to alternator and battery capacities and to the typically required battery charging rate and the time allowed for battery recharging. The potentiometer 54 is adjusted to fire the silicon controlled rectifier 56 shortly before the battery charging rate becomes excessive or before excessive gassing sets in within the cells of the battery 24. At that point, current flow begins through the light emitting diode 46 and its current limiting resistor 60. The diode 46 begins to light and indicates that the field current chosen by the operator has been interrupted. Sufficient current is flowing through the resistor 32 and the diode 62 and through the light emitting diode 46 and the resistor 60 to exceed the holding current through the silicon controlled rectifier 20 to maintain it in its conductive state.

Without positive action by the operator, the circuit remains off, the selected field current remains interrupted and the silicon controlled rectifier 56 remains latched until the battery system is disconnected which may occur when engine and alternator are being shut down, for example, when the connection between the terminal 68 and the batter 24 is made through an ignition switch (not shown) or any other engine related switch. During a subsequent engine start up, the silicon controlled rectifier 56 will again be in a non-conducting state and field current to the alternator 12 will again flow through the transistor 28 according to the setting of the potentiometer 36.

When battery charging at a high selected rate has been interrupted because the cutoff voltage determined by the zener diode 48 and the setting of the potentiometer 54 has been reached, the circuit can be reset without changing the cutoff voltage setting. It is necessary only that the setting of the potentiometer 36 be reduced and the circuit then momentarily disconnected from the positive or negative terminals of the electric system, for example, by briefly opening the switch 42 to interrupt current through the silicon controlled rectifier 56 and to terminate its latched conductive state. When the switch 42 is closed again, lower alternator field current due to the lower setting of the potentiometer 36 will coincide with a correspondingly lower voltage at the battery 24 and at the positive terminals 68 and 44 of the circuit. With the lower charging current, battery voltage will increase more slowly until the cutoff voltage is reached again and the circuit again disconnected. The response of the voltage sensing circuit can be made to ignore voltage pulses of short duration by incorporation of a capacitor 74 connected between the silicon controlled rectifier 56, the gate terminal 64 and ground. The transistor 28 is shown to be protected against reverse voltage by diode 76, the diode 76 is not required if a preferred Darlington transistor is internally fitted with a similarly functional diode between the emitter and collector of such a transistor.

It is to be understood that the invention can be configured other than as explicitly described herein without departing from the intended scope of the invention. Accordingly, it is understood that the invention is to be interpreted in light of the foregoing and as defined in the appended claims.

What is claimed is:

1. A system for the controlled charging of a secondary battery operating in association with an engine and including an alternator having an alternator field coil and alternator field coil terminals, the alternator being normally controlled by a voltage regulator connected to the alternator field coil, the battery being charged by the engine through the alternator, the system comprising:

means adapted to be manually operated for selecting an alternator output or charging current;

means connected to the battery for sensing the voltage of the battery and for generating a signal indicative of the battery voltage; and, control means connected to the alternator field coil through the alternator field coil terminals in parallel to the voltage regulator and including cutoff circuit means connected to the battery voltage sensing means and responsive thereto for discontinuing and preventing reapplication of charging current to the battery when the battery has reached full charge, when the charging current has become excessive as the battery approaches full charge or when the selected charging current is excessive for the capacity of the battery.

2. The system of claim 1 wherein the alternator has positive and negative field coil terminals and wherein the voltage regulator is connected to the alternator field coil between the negative field terminal and ground.

3. The system of claim 1 wherein the alternator has positive and negative field coil terminals, wherein the control means have positive and negative terminals, and wherein the voltage regulator is connected to the alternator field coil between the positive field coil terminal and the positive terminal of the control means.

4. The system of claim 1 wherein the selecting means comprises a potentiometer which is manually set to yield a charging current capable of producing a charge of a selected number of ampere hours within a selected time period.

5. The system of claim 1 and further comprising means connected to the cutoff circuit means and adapted to be manually operated for selecting the voltage at which the cutoff circuit means operate.

6. The system of claim 5 wherein the last-mentioned means comprise a voltage selecting potentiometer which is manually set at a voltage dependent on the battery voltage and at which charging current is discontinued.

7. The system of claim 6 wherein the means for selecting charging current comprises a current selecting potentiometer which is manually set to yield a charging current capable of producing a charge of a selecting number of ampere hours within a selected time period.

8. The system of claim 1 and further comprising means for switching off the control means and returning the alternator to normal operation governed by the voltage regulator.

9. The system of claim 1 and further comprising means responsive to discontinuation and subsequent resumption of engine operation for resetting the control means to resume charging of the battery at the manually selected charging rate.

10. The system of claim 1 and further comprising means for manually resetting the last-mentioned means during operation of the engine and alternator.

11. The system of claim 1 and further comprising means for indicating to an operator the interruption of operation of the control means.

12. The system of claim 7 wherein the control means comprise an NPN transistor having a collector connected to negative field coil terminal of the alternator field coil, the negative field coil terminal being connected to a circuit comprising a first resistor and a first diode, the circuit including the charge selecting potentiometer, the charge selecting potentiometer having a wiper comprising the means for selecting the charging current, the wiper being adapted to be manually movable between positions repectively nearmost minus or ground of the charge selecting potentiometer and positive of the charge selecting potentiometer to cause current to be supplied to the transistor in a range wherein the transistor exists in a non-conducting state at one end of the range to a near saturation or full conductive state at the other end of the range, the resistor having a resistive value such that transistor base current renders the transistor fully conductive when the wiper of the charge selecting potentiometer is nearest positive of the charge selecting potentiometer and thus nearest the diode and the resistor.

13. The system of claim 12 wherein the cutoff circuit means comprises a switch, a system terminal, a light emitting diode, and a zener diode connected to the positive terminal of the battery, the zener diode becoming conductive at a voltage approximately one volt below the nominal voltage of the battery, the circuit means further comprising a voltage divider comprised of a second resistor and a trim potentiometer having a wiper, the trim potentiometer comprising the voltage selecting potentiometer, the voltage divider being connected between the zener diode and ground, the wiper of the trim potentiometer being connected to a gate terminal of a silicon controlled rectifier which becomes conductive when voltage at the system terminal reaches a value indicative of the battery reaching a state of recharge or indicative that the selected charging current is excessive for the battery being charged, the silicon controlled rectifier opening a conductive path between its anode and ground of the charge selecting potentiometer to allow current to flow through the light emitting diode and a current limiting resistor to cause the light emitting diode to become illuminated, current also flowing through a blocking diode with current being thereby diminished to the first diode sufficiently to interrupt base current of the transistor and to render the transistor non-conducting, current manually selected through setting of the charge selecting potentiometer being interrupted as the silicon controlled rectifier becomes conductive as signified by the illumination of the light emitting diode, the manual setting of the voltage selecting potentiometer controlling the firing voltage applied to a gate terminal of the silicon controlled rectifier, the firing voltage being matched to the capacity of the alternator, current through the light emitting diode and the current limiting resistor and current through the first resistor and the blocking diode being sufficiently great to hold the silicon controlled rectifier in a conducting state and to prevent overriding field current flow until the circuit means are manually reset or until the system has been switched off and then switched on again.

* * * * *